United States Patent
Ochayon et al.

[11] Patent Number: 5,598,751
[45] Date of Patent: Feb. 4, 1997

[54] CUTTING INSERT

[75] Inventors: Moti Ochayon, Nahariya; Arie Falk, Moshav Merhavia, both of Israel

[73] Assignee: Iscar Ltd., Migdal Tefen, Israel

[21] Appl. No.: 557,258

[22] Filed: Nov. 14, 1995

Related U.S. Application Data

[62] Division of Ser. No. 289,460, Aug. 12, 1994, Pat. No. 5,496,137.

[30] Foreign Application Priority Data

Aug. 15, 1993 [IL] Israel ........................ 106697

[51] Int. Cl.⁶ ................................. B23B 51/00
[52] U.S. Cl. .................. 76/108.6; 76/108.1; 408/226; 408/233; 408/713
[58] Field of Search ................ 408/226, 233, 408/239 A, 239 R, 713; 279/8; 76/108.6, 108.1, 108.2, 108.3

[56] References Cited

U.S. PATENT DOCUMENTS

| Re. 34,256 | 5/1993 | Strand et al. ............ 408/239 A |
| 756,339 | 4/1904 | Down ........................ 76/108.6 X |
| 1,191,717 | 7/1916 | Moore ........................ 408/226 |
| 1,881,024 | 10/1932 | Lang ............................ 408/713 |
| 4,394,421 | 7/1983 | Chmura et al. . | |
| 4,834,596 | 5/1989 | Hollifield et al. .......... 408/239 A |
| 5,248,474 | 8/1993 | Morgan . | |

FOREIGN PATENT DOCUMENTS

| 2602162 | 2/1988 | France ..................... B29B 29/12 |
| 3241382A1 | 6/1983 | Germany . |
| 2067440 | 7/1981 | United Kingdom . |

OTHER PUBLICATIONS

Patent Abstracts of Japan, vol. 5, No. 158 (M–91) (830) 12 Oct. 1981 and JP–A56 0866 638 (Ricoh K.K.) 14 Jul. 1981 (Abstract).

Primary Examiner—Douglas D. Watts
Attorney, Agent, or Firm—Pennie & Edmonds

[57] ABSTRACT

A cutting insert having a cutting head and a coupling shank integral at one end thereof with the cutting head and including a screw threaded portion. The cutting insert is formed by a powder metallurgy process of compacting and sintering and the screw threaded portion is constituted by a substantially cylindrical body having a pair of diametrically opposed, longitudinally truncated planar portions interposed between substantially curved cylindrical portions having arcuate surfaces on which there are formed a non-continuous screw thread, the arcuate surfaces extending between 50 to 85% of the total peripheral extent of the cylindrical body of which they form part. There is also disclosed a powder metallurgy process for manufacturing the cutting insert.

4 Claims, 5 Drawing Sheets

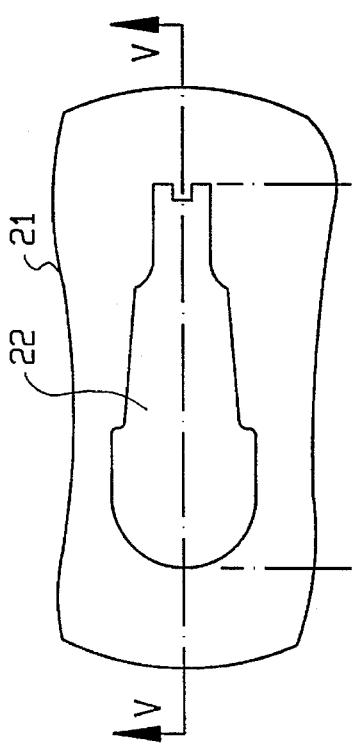
FIG. 4
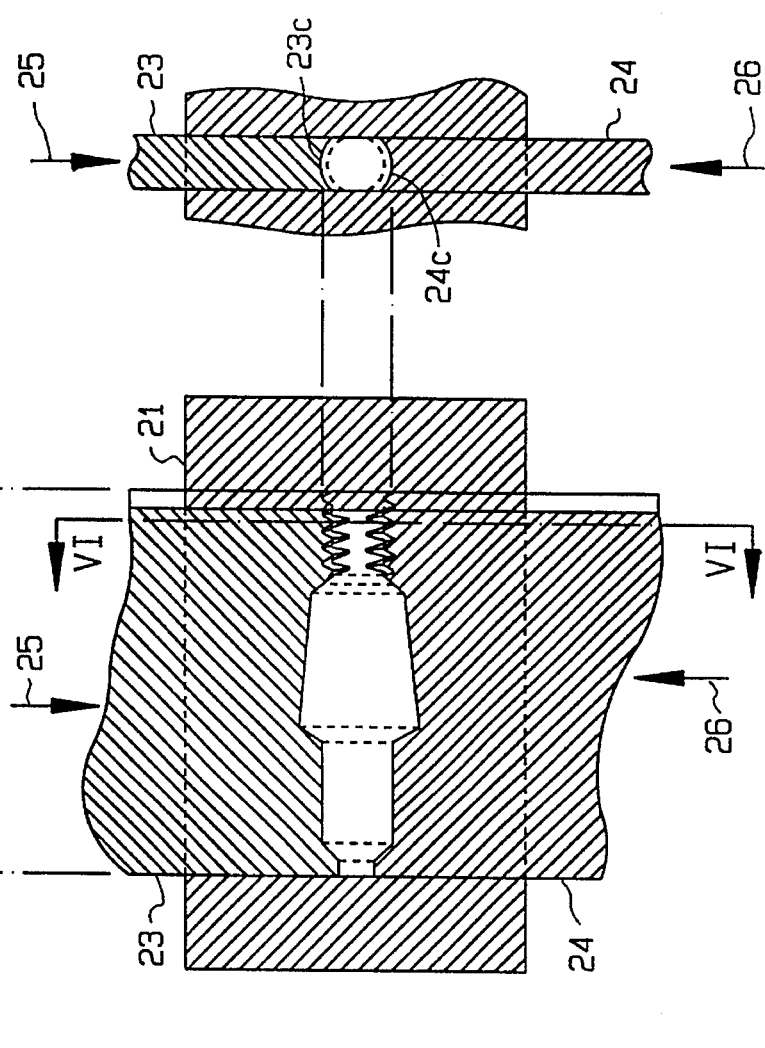
FIG. 5
FIG. 6

CUTTING INSERT

This application is a divisional application of U.S. patent application Ser. No. 08/289,460, filed Aug. 12, 1994 now U.S. Pat. No. 5,496,137.

FIELD OF THE INVENTION

This invention relates to a replaceable cutting insert for use with a cutting tool in metalworking operations such as, for example, rotary cutting tools for use in milling and drilling. The invention relates particularly to such a cutting insert of the kind wherein an insert cutting head is formed integrally with a screw threaded coupling shank by means of which the insert can be releasably screw coupled to a tool holder.

BACKGROUND OF THE INVENTION

Such cutting inserts with integrally formed screw threaded coupling shanks have long been known and form the subject, for example, of British Standard 122-Part 4. Such a cutting insert is also disclosed in French Patent Specification No. 2602162.

Replaceable cutting inserts in general, and especially the cutting heads thereof, are usually formed of compacted sintered hard metals such as, for example, tungsten carbide with a suitable binder. The provision of such hard metal cutting heads with integrally formed screw threaded coupling shanks has not been hitherto proposed. It is clear that there are inherent difficulties in forming screw threading on a coupling shank formed by powder metallurgy techniques. Thus, any attempt to provide the coupling shank during a compacting process with the required screw threading, would invariably result in the production of a ridge of excess material in the region where two die punches approach each other. This is in view of the fact that the adjacent edges of the die punches have to have a minimal thickness in order to avoid punch breakage. This ridge must clearly be removed by subsequent machining in order to allow for screw coupling.

It has been proposed in U.S. Pat. No. 5,248,474 to manufacture by hot isostatic pressing and sintering of metal powder, large diameter metal parts for use as electrodes for high temperature electric arc furnaces. Such metal parts are, after sintering, subjected to machining so as to form thereon suitable threading. Clearly, applying this concept of subsequent machining of an insert formed by a powdered metallurgy technique so as to impart to it appropriate threading would increase the costs of manufacture of the insert.

It is an object of the present invention to provide a new and improved cutting insert having an integral screw threaded coupling shank in which the above-referred-to difficulties are substantially reduced or overcome.

BRIEF SUMMARY OF THE INVENTION

According to the present invention there is provided a cutting insert comprising a cutting head and a coupling shank integral with said cutting head and including a screw threaded portion, characterized in that said cutting insert is formed by a powder metallurgy process of compacting and sintering and said screw threaded portion is constituted by a substantially cylindrical body having a pair of diametrically opposed, longitudinally truncated planar portions interposed between substantially curved cylindrical portions having arcuate surfaces on which there are formed a non-continuous screw thread, said arcuate surfaces extending between 50 to 85% of the total peripheral extent of the cylinder of which they form part.

Such a cutting insert is manufactured, in accordance with the invention, by a powder metallurgy process including the step of compacting a metal powder in a mold cavity of a die set between a pair of die punches displaceable within said cavity, said screw portion being formed between arcuate surfaces of said punches and substantially planar walls of said die cavity.

By virtue of the fact that the screw threading is formed on diametrically opposed arcuate portions of the cylindrical body and are spaced apart by the substantially planar wall portions of the body, it is ensured that the non-continuous threading is formed during compacting without the disadvantages referred to above.

BRIEF DESCRIPTION OF THE DRAWINGS

For a better understanding of the present invention and to show how the same may be carried out in practice, reference will now be made to the accompanying drawings, in which:

FIG. 4 is a plan view from above of a mold forming part of the die set shown in FIG. 3;

FIG. 5 is a longitudinally sectioned view of the die set including the mold shown in FIG. 4 taken along the line V:V;

FIG. 6 is a cross-sectional view of the die set shown in FIG. 5 taken along the line VI:VI

DETAILED DESCRIPTION OF PREFERRED EMBODIMENT

Figure 1:
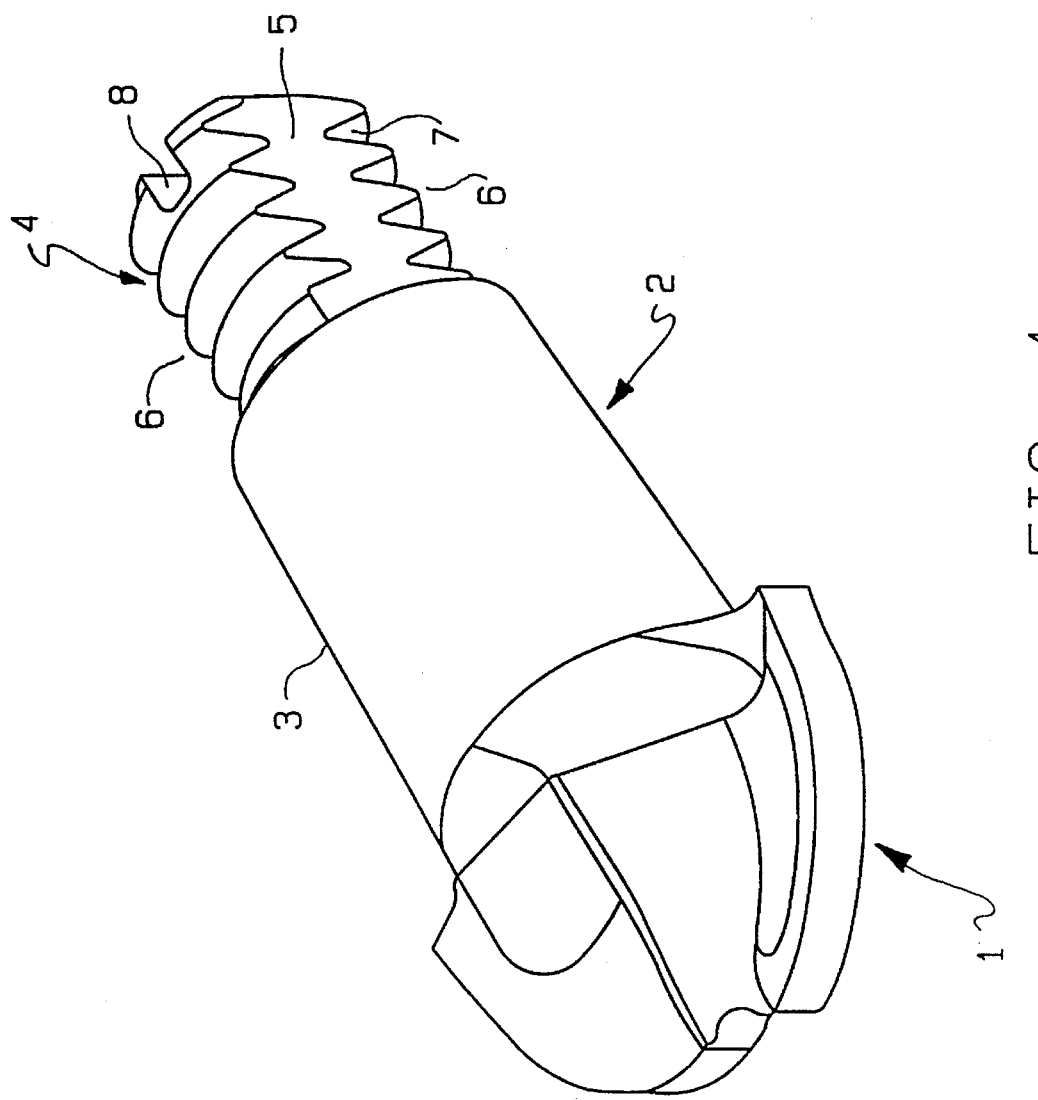
FIG. 1 is a perspective view of one form of cutting insert in accordance with the present invention.

As seen in FIG. 1 of the drawings, a replaceable cutting insert comprises a cutting head 1 and an integrally formed elongated coupling shank 2. The cutting head 1 can take any required form and its design has no bearing on the present invention and therefore will not be described.

The coupling shank 2 comprises an elongated frustoconical clamping portion 3 formed integrally at its wider end with the cutting head 1 and at its narrower end with a substantially cylindrical, screw threaded portion 4. The screw threaded portion 4 is formed with a pair of diametrically opposed, longitudinally truncated portions 5 (only one of which is seen in FIG. 1 of the drawings) having substantially planar surfaces and being interposed between substantially curved, cylindrical portions 6 on whose arcuate surfaces a non-continuous screw threading 7 is formed.

A key slot 8 is formed in an end face of the cylindrical screw threaded portion 4.

The screw threading 7, whilst being non-continuous, nevertheless follows the contour of a full helical screw threading, extending around the arcuate surfaces of the screw threaded portion 4. The peripheral extent of these arcuate surfaces occupy between 50 to 85% (preferably 60 to 70%) of the total peripheral extent of a complete cylinder.

Figure 2:
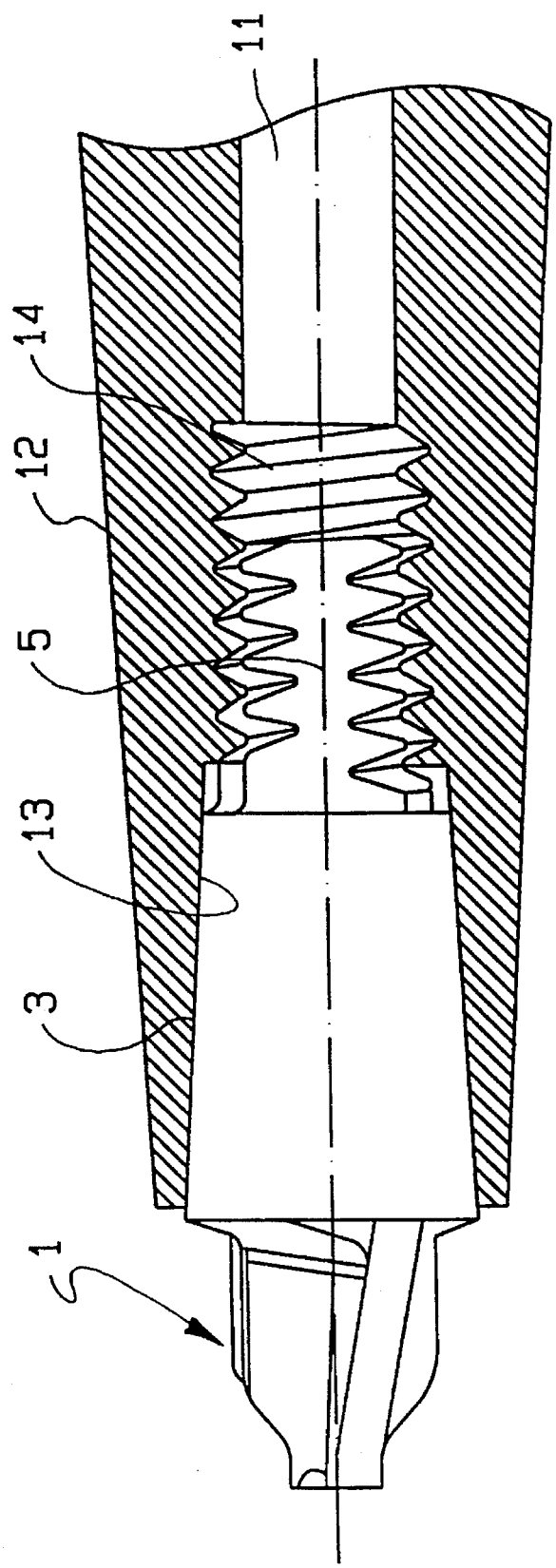
FIG. 2 is a longitudinally sectioned view of the insert shown in FIG. 1 when screw coupled in a toot holder.
Figure 3:
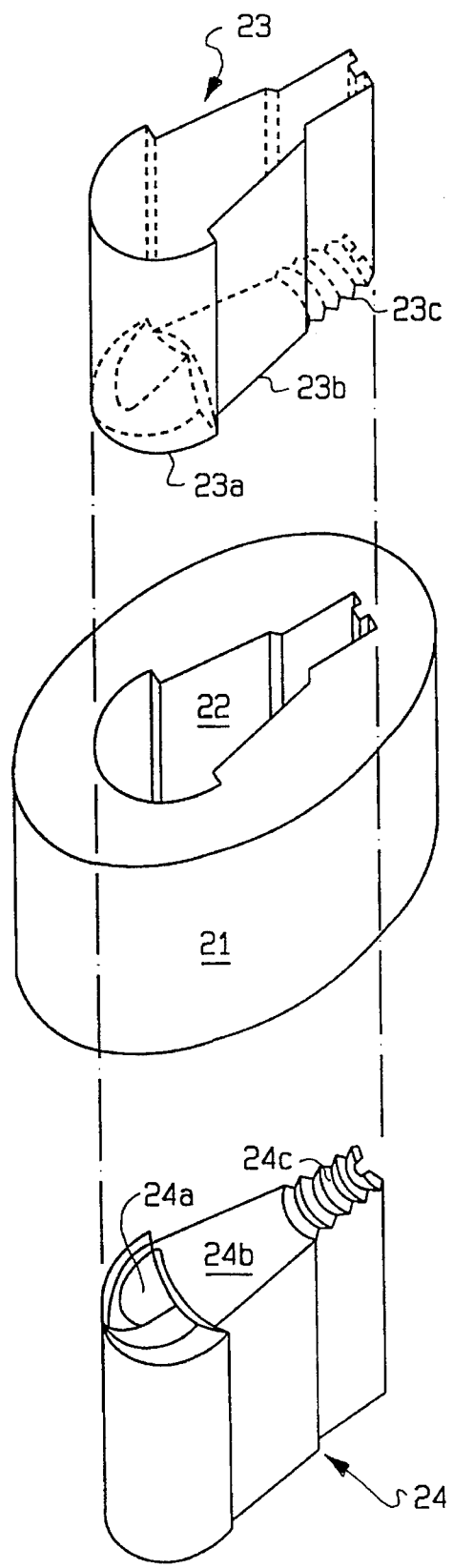
FIG. 3 is an exploded view of a die set for use in forming the cutting insert shown in FIG. 1.
Figure 7:
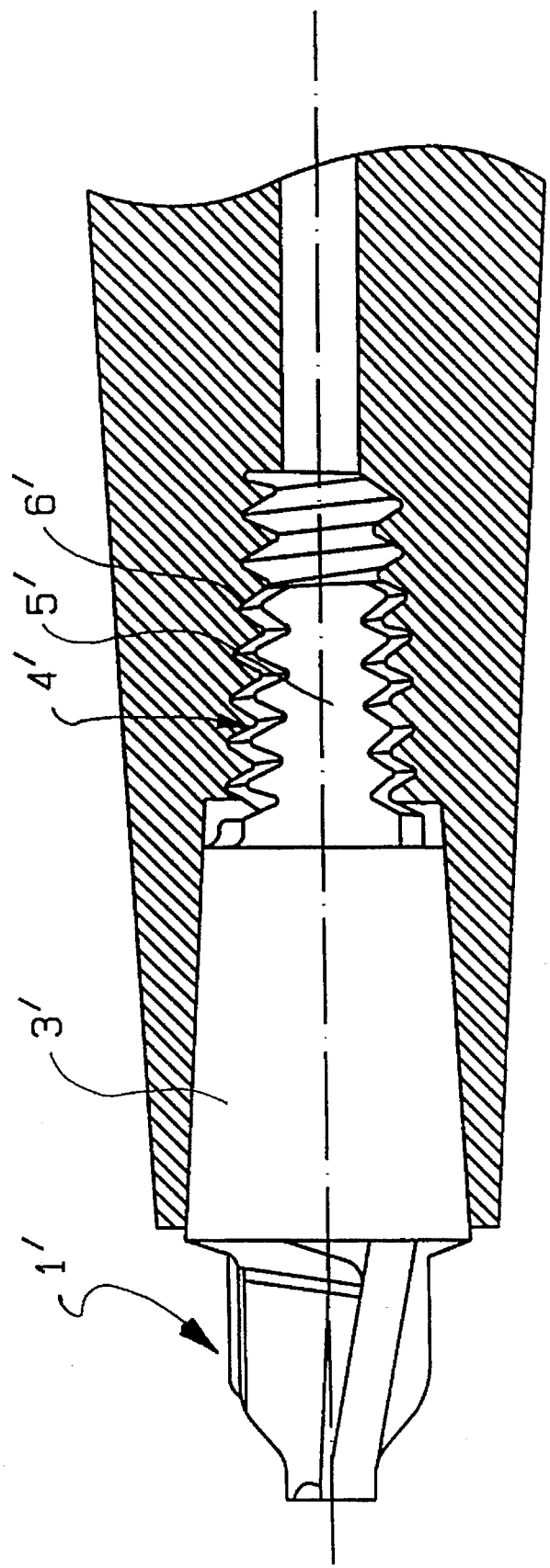
FIG. 7 is a longitudinal sectional view, similar to FIG. 2, of another form of a cutting insert in accordance with the present invention.

FIG. 7 shows an embodiment similar to that shown in FIGS. 1 and 2, except for the shape of the threaded portion. In FIG. 7, the cutting head 1' includes a clamping portion 3' and a screw-threaded portion 4'. The screw-threaded portion 4', in turn, defines a curved conical portion 6', which forms part of a substantially right conical body, as opposed to a right circular cylindrical body of the construction of FIGS. 1 and 2. The screw-threaded portion 4' of the embodiment of FIG. 7 also includes planar portions 5' as included in the embodiment of FIGS. 1 and 2.

As seen in FIG. 2 of the drawings, the insert is screw coupled within a longitudinally extending bore 11 formed in a tool holder 12.

An outer end 13 of the bore 11 has a conically tapering form corresponding to the conical shape of the clamping portion 3 of the coupling shank 2. This conically tapering portion tapers from the outer extremity of the tool holder 12 towards an inner screw threaded portion 14 of the bore 11.

The coupling shank 2 of the insert is inserted into the bore 11 of the tool holder 12 and its screw threaded portion 4 is screw coupled to the internal threaded portion 14 of the bore 11, thereby drawing the conical clamping portion 3 of the insert into clamping contact with the corresponding conically tapering wall 13 of the tool holder 12. It will be appreciated that in order to ensure effective retention of the shank within the tool holder during rotational operation of the tool the threading helix must be directed in the same sense as that of the rotation of the tool.

Screw coupling and release of the insert is effected by simple rotation of the cutting head 1 thereof, using for this purpose a suitable key (not shown). However, in the event of breakage of the cutting head 1 and removal of the screw shank, release can be effected by means of an appropriate screwdriver inserted into the bore 11 at its end remote from the cutting head 1, so as to engage with the slot 8, rotation of the screwdriver resulting in the release of the coupling shank from the tool holder.

The cutting insert, together with its coupling shank and screw threaded portion, are formed using a powder metallurgy technique by compacting and sintering. For this purpose, any suitable metal powder such as, for example, tungsten carbide with a suitable binder, or steel, can be employed.

Reference will now be made to FIGS. 3 to 6 of the drawings for a description of the compacting stage of the manufacture of the insert.

As seen in the drawings, there is employed in the compacting stage a die set comprising a mold 21 in which is formed a mold cavity 22. The die set furthermore comprises upper and lower die punches 23 and 24. The die punches 23 and 24 are respectively formed with die surfaces 23a, 23b, 23c and 24a, 24b, 24c corresponding respectively to the cutting head, clamping portion and screw threaded portion of the insert to be formed. The surfaces 23b, 24b, and 23c, 24c correspond to diametrically opposite portions of the coupling shank cutting insert.

In operation, the hard metal powder to be compacted is located within the mold cavity 22, resting on the die surface of the lower punch 24. The punches 23 and 24 are brought together under pressure in the direction of the arrows 25, 26 so as to compact the interposed powder as seen in FIGS. 5 and 6 of the drawings. The arcuate surface portions 23b, 24b; 23c, 24c of the punches 23, 24 are, in their final compacting position, spaced from one another so that, effectively, the conical and screw threaded portions of the coupling shaft are defined between these spaced apart arcuate surfaces and the substantially planar surfaces of the mold cavity.

In this way, there is formed a compacted body corresponding in shape to that of the ultimate insert but being of significantly greater volume (about 20%). After sintering and consequent shrinkage of the body, the insert attains its ultimate, final dimensions. Thus there are formed frustoconical and screw threaded portions having arcuate surfaces corresponding to the arcuate surfaces 23b, 23c and 24b, 24c of the die punches 23 and 24, but there being interposed between these arcuate surfaces truncated, substantially planar surfaces corresponding to the planar surfaces of the mold cavity.

It will be readily seen that separation and release of the die punches can be readily effected, leaving a clean, non-continuous screw threading formed on the arcuate surfaces of the cylindrical screw threaded portion.

Provided the arcuate screw threaded surface of the cylindrical portion extends for not substantially less than 50% of the total circumference of the full cylinder, it can be ensured that effective screw coupling of the insert within the correspondingly screw threaded cavity of the tool holder is effected. Furthermore, by ensuring that these arcuate surfaces do not substantially extend by more than 85% of the total peripheral extent of the complete cylinder, it can be ensured that the formation of the screw threading is not accompanied by the formation of "ridges" which would have to be subsequently removed. Preferably, the arcuate screw threaded surface extends between 60 to 70% of the total peripheral extent of the cylinder of which they form part.

After sintering, the frustoconical portion is ground so as to attain a regular conical surface. It will be appreciated in this connection that whilst the final dimensions of the frustoconical portion have to be accurately determined so that it fulfills its clamping and locking function (hence the need to effect grinding), the dimensions of the screw threaded portion have not to be determined so critically and their final determination by compacting and sintering alone suffice for effective screw coupling.

Whilst in the preferred embodiment the insert has been described as having a frustoconical clamping portion and a right circular screw threaded portion, the invention is equally applicable to inserts having conical screw threaded portions, as well as inserts without separate clamping portions or with inserts wherein the screw threaded portions are interposed between the cutting heads and the clamping portion.

We claim:

1. A powder metallurgy process for manufacturing a cutting insert having a cutting head and a coupling shank integral at one end thereof with said cutting head and including a screw threaded portion, said cutting insert being formed by a powder metallurgy process of compacting and sintering and said screw threaded portion being constituted by a substantially cylindrical body having a pair of diametrically opposed, longitudinally truncated planar portions interposed between substantially curved cylindrical portions having arcuate surfaces on which there are formed a non-continuous screw thread, said arcuate surfaces extending between 50 to 85% of the total peripheral extent of the cylindrical body of which they form part, said process including the steps of compacting a metal powder in a mold cavity of a die set between a pair of die punches displaceable within said cavity, and forming said screw and clamping portions between arcuate surfaces of said punches and substantially planar walls of said mold cavity.

2. A process according to claim 1, wherein said arcuate surfaces extend between 60 to 70% of the total peripheral extent of the cylindrical body of which they form part, and said process further includes the step of grinding said clamping portion subsequent to the sintering of the insert so as to form a final conical shape thereof.

3. A process according to claim 1, characterized in that said metal powder comprises tungsten carbide powder and a suitable binder.

4. A process according to claim 1, characterized in that said metal powder comprises steel powder.

* * * * *